United States Patent
Nakashima et al.

(10) Patent No.: US 6,789,038 B2
(45) Date of Patent: Sep. 7, 2004

(54) TIRE CONDITION ESTIMATING APPARATUS AND METHOD

(75) Inventors: Seiichi Nakashima, Nishikamo-gun (JP); Yukio Mori, Nagoya (JP)

(73) Assignees: Toyota Jidosha Kabushiki Kaisha, Toyota (JP); Advics Co., Ltd., Kariya (JP)

(*) Notice: Subject to any disclaimer, the term of this patent is extended or adjusted under 35 U.S.C. 154(b) by 0 days.

(21) Appl. No.: 10/388,702

(22) Filed: Mar. 17, 2003

(65) Prior Publication Data

US 2003/0200051 A1 Oct. 23, 2003

(30) Foreign Application Priority Data

Mar. 26, 2002 (JP) ........................................ 2002-085706

(51) Int. Cl.[7] .............................. G01P 5/00; B60Q 1/00; B60C 23/02
(52) U.S. Cl. ...................... 702/142; 702/138; 73/146.2; 340/443; 340/444
(58) Field of Search ................................ 702/138, 140, 702/142; 73/146; 340/438, 442, 443, 444

(56) References Cited

U.S. PATENT DOCUMENTS

| | | | |
|---|---|---|---|
| 6,584,427 B2 | * | 6/2003 | Kamiya et al. ............. 702/140 |
| 2002/0095264 A1 | | 7/2002 | Kamiya et al. |

FOREIGN PATENT DOCUMENTS

| | | |
|---|---|---|
| JP | A 8-164720 | 6/1996 |
| JP | A 10-129222 | 5/1998 |
| JP | B2 2836652 | 10/1998 |
| JP | A 2000-238516 | 9/2000 |

OTHER PUBLICATIONS

U.S. patent application Ser. No. 10/258,541, Kojima et al., filed Nov. 14, 2002.
U.S. patent application No. 10/264,282 filed Feb. 6, 2002.
U.S. patent application No. 10/264,263 filed Feb. 6, 2002.

* cited by examiner

Primary Examiner—John Barlow
Assistant Examiner—Meagan Walling
(74) Attorney, Agent, or Firm—Oliff & Berridge, PLC

(57) ABSTRACT

An apparatus and method to estimate the condition amount of a vehicle tire in a vehicle equipped with vehicle wheels formed with air enclosed under pressure in an inside portion of a tire mounted to a disc wheel. A plurality of wheel speed sensors detect the vehicle speed of each vehicle wheel. An estimating unit obtains a reflected value reflecting the tire condition amount of a vehicle wheel based on the vehicle wheel speed, and estimates the tire condition based upon the reflected value. The estimating unit estimates a reflected value for a first vehicle wheel which is difficult to accurately obtain the reflected value based on the vehicle wheel speed by obtaining the reflected value for a second vehicle wheel which is easier to accurately obtain the reflected value based on the wheel speed.

28 Claims, 14 Drawing Sheets

TIRE CONDITION ESTIMATING APPARATUS AND METHOD

INCORPORATION BY REFERENCE

The disclosure of Japanese Patent Application No. 2002-085706 filed on Mar. 26, 2002 including the specification, drawings and abstract incorporated herein by reference in its entirety.

BACKGROUND OF THE INVENTION

1. Field of Invention

The invention relates to an art for estimating a tire condition amount in a vehicle, in particular, it relates to an art for estimating the tire condition amount based upon a rotational speed of that tire.

2. Description of Related Art

An art that estimates tire condition amounts such as tire pressure for purposes including the discovery of tire abnormalities in a vehicle while the vehicle is running already exists.

In an example of this art, a wheel speed sensor is fixed to a vehicle body side and used to detect a vehicle wheel speed of a vehicle wheel consisting of a tire fixed to a disc wheel. A tire condition amount is estimated by the wheel speed sensor.

More specifically, a reflected value that reflects the tire condition amount based upon the vehicle wheel speed detected by the wheel speed sensor is obtained, and the tire condition amount is estimated based upon the obtained reflected value.

As specific systems that estimate tire pressure as a tire condition amount, a dynamic load tire radius system and a tire vibration system are known.

In addition, a resonance frequency system, a disturbance observer system and the like are known tire vibration systems. In a case where the resonance frequency system is employed, the tire resonance phenomenon does not appear as conspicuously within a high speed region where a vehicle wheel speed or a vehicle speed is high, as in a low speed region.

Therefore, in Japanese Patent Laid-Open Publication No. 10-129222, the following type of art is disclosed for obtaining a resonance frequency of a rear vehicle wheel not only in a condition where the vehicle speed is in a low speed region, i.e. a condition where the resonance frequency detected for the rear vehicle wheel does not reach a detection limit, but also in a condition where the vehicle speed is in a high speed region, i.e. a condition where the resonance frequency detected for the rear vehicle wheel has reached a detection limit.

In that art, the resonance frequency of each vehicle wheel and the dynamic load radius reflected value that reflects a dynamic load radial difference between a front vehicle wheel and a rear vehicle wheel is used to determine the presence of abnormalities in the tire pressure condition.

Specifically, when the resonance frequency of the rear vehicle wheel does not exceed the detection limit, the resonance frequency of the rear vehicle wheel is detected, and the presence of abnormalities in the rear wheel tire pressure condition is determined based upon the detected resonance frequency.

On the contrary, when the resonance frequency of the rear vehicle wheel exceeds a detection limit, the resonance frequency of the rear vehicle wheel is estimated based upon the dynamic load radius reflected value at that time, and a previously detected resonance frequency for the rear vehicle wheel during a state in which the detection limit of the resonance frequency regarding the rear vehicle wheel was not exceeded.

Thus, according to the art disclosed in Japanese Patent Laid-Open Publication No. 10-129222, the resonance frequency of the rear vehicle wheel after exceeding the detection limit is estimated based upon the rear wheel resonance frequency prior to exceeding the detection limit, and the dynamic load radius reflected value after exceeding the detection limit.

Therefore, in this art, to estimate the rear wheel resonance frequency during an estimating period after the detection limit has been exceeded, an obtained resonance frequency for any one of the vehicle wheels cannot be used in a period corresponding to the estimating period.

Namely, according to this art, the resonance frequency detected before the estimating period is used in order to estimate the resonance frequency of the rear vehicle wheel in an estimating period after the detection limit has been exceeded.

Furthermore, according to this art, data obtained during a period corresponding to the estimating period is also used in order to estimate the resonance frequency of the rear vehicle wheel in an estimating period after the detection limit has been exceeded; that data is the dynamic load radius reflected value.

The physical type of the dynamic load radius reflected value is different from that of the resonance frequency that needs to be estimated for the rear vehicle wheel. Therefore, mutual conversion therebetween is necessary.

Also, since the dynamic load radius reflected value is generally obtained as one value representing all vehicle wheels in the vehicle, it is a physical amount with which it is difficult to reflect the tire pressure condition of each tire independent from the other tires.

Therefore, with this art there is a limit to improving the accuracy of estimating the resonance frequency of the rear vehicle wheel after the detection limit has been exceeded.

In other words, with this art it is difficult to accurately obtain a reflected value that reflects a tire condition amount of a vehicle wheel for which it is difficult to accurately obtain the reflected value among plural vehicle wheels in a vehicle.

SUMMARY OF THE INVENTION

It is an object of the invention to accurately obtain using other data, a reflected value that reflects a tire condition amount of a vehicle wheel for which is it difficult to accurately obtain the reflected value among plural vehicle wheels in a vehicle.

A first aspect of the invention relates to an apparatus that estimates the tire condition amount of each vehicle wheel, and is provided in a vehicle equipped with vehicle wheels formed with air enclosed under pressure in an inside portion of a tire mounted to a disc wheel. The apparatus includes a plurality of wheel speed sensors which detect a vehicle wheel speed of each vehicle wheel, a respective one of the sensors being provided in relation to a respective one of the plurality of vehicle wheels, and an estimating unit that obtains a reflected value reflecting a tire condition amount of each of the plurality of vehicle wheels based upon the vehicle wheel speed detected by each of the plurality of wheel speed sensors, and estimates the tire condition amount of each of the plurality of vehicle wheels based upon the obtained reflected value. The estimating unit estimates a reflected value of a first vehicle wheel for which it is relatively difficult to accurately obtain the reflected value based upon a vehicle wheel speed of the first vehicle wheel among the plurality of vehicle wheels, during a first period corresponding to a second period for obtaining the reflected value of the first vehicle wheel, based upon a reflected value obtained for a second vehicle wheel for which it is relatively easy to accurately obtain the reflected value based upon the vehicle wheel speed of the second vehicle wheel, in order to obtain the reflected value of the first vehicle wheel.

In the art disclosed in Japanese Patent Laid-Open Publication No. 10-129222 mentioned above, a resonance frequency of a rear vehicle wheel that is the first vehicle wheel, for which it is difficult to accurately obtain the reflected value that reflects the tire condition amount based upon the vehicle wheel speed, is estimated before the obtaining period using an obtained resonance frequency of a front vehicle wheel that is the second vehicle wheel, for which it is easier to accurately obtain the reflected value that reflects the tire condition amount based upon the vehicle wheel speed.

Therefore, in the art of Japanese Patent Laid-Open Publication No. 10-129222, the resonance frequency of the rear vehicle wheel cannot be estimated using the resonance frequency of the front vehicle wheel obtained during a period corresponding to the period when the resonance frequency of the rear vehicle wheel needs to be obtained.

Meanwhile, knowledge acquired through the research of the inventors of the invention indicated that under given conditions, a specific relationship is established at a mutually corresponding time between the first vehicle wheel and the second vehicle wheel in relation to the reflected value, and it is possible to obtain that specific relationship prior to use of the vehicle by a user.

The specific relationship is, for example, easily affected by the vehicle wheel load that perpendicularly acts on each vehicle wheel from the vehicle body, and a suspension characteristic connecting each vehicle wheel to the vehicle body. However, as long as the tire type of each vehicle wheel is replaced within the permissible range, it is hardly affected by the tire type. In other words, that specific relationship is minimally dependent on the tire type of each vehicle wheel.

Based upon the above described knowledge, in the apparatus according to the first aspect of the invention, the reflected value of the first vehicle wheel is estimated using the reflected value obtained for the second vehicle wheel in a period corresponding to the obtaining period thereof.

Therefore, according to this device, unlike the art of Japanese Patent Laid-Open Publication No. 10-129222, the reflected value of the first vehicle wheel can be estimated using the reflected value obtained for the second vehicle wheel in a period corresponding to a period when the reflected value of the first vehicle wheel needs to be obtained, thus enabling easy improvement of estimation accuracy of the reflected value of the first vehicle wheel.

In the first aspect of the invention, "estimating a tire condition amount" can be interpreted to signify estimating an absolute value of the tire condition amount, estimating a relative value (i.e. amount of variation) with respect to a threshold value of the tire condition amount, and estimating whether the tire condition amount is large or small with respect to a threshold value; i.e. determining the size of the tire condition amount.

In the invention, "period corresponding to an obtaining period", e.g., a first period corresponding to a second period for obtaining the reflected value, can be interpreted to signify a period completely identical to the obtaining period, a period that is virtually identical to the obtaining period, and a period whose difference from the obtaining period is within a set range.

A second aspect of the invention relates to an apparatus that estimates a tire condition amount of a vehicle wheel and is provided on a vehicle equipped with vehicle wheels formed with air enclosed under pressure in an inside portion of a tire mounted to a disc wheel. The apparatus includes a wheel speed sensor that detects a vehicle wheel speed of the vehicle wheel, and an estimating unit that, based on the vehicle wheel speed detected by the wheel speed sensor, obtains a reflected value reflecting a tire condition amount of the vehicle wheel and estimates the tire condition amount based upon the obtained reflected value. The estimating unit determines that there is a high probability that the tire condition amount of the vehicle wheel is normal if it is relatively difficult to accurately obtain the reflected value based upon the detected vehicle wheel speed, and determines that there is a high probability that the tire condition amount of the vehicle wheel is abnormal if it is easy to accurately obtain the reflected value based upon the detected vehicle wheel speed.

As described earlier, there are cases in which, the reflected value of the vehicle wheel cannot be accurately obtained when the tire condition amount (for example, tire pressure and the like) is normal. Reversing this causal relationship, it follows that if the reflected value of the vehicle wheel can be accurately obtained, then there is a high probability that the tire condition amount of that vehicle wheel is abnormal.

Based upon such knowledge, if the reflected value is difficult to accurately obtain based upon the detected vehicle wheel speed, then it is determined that there is a high probability that the tire condition amount of the vehicle wheel is normal, and if the reflected value is easy to accurately obtain, then it is determined that there is a high probability that the tire condition amount of the vehicle wheel is abnormal.

The determination whether accurately obtaining the reflected value based upon the detected vehicle wheel speed is difficult can generally be conducted with relative ease and in a short time.

Therefore, according to this apparatus, it becomes relatively easy and simple to make the determination whether there is a high probability that the tire condition amount of the vehicle wheel is abnormal in a short time.

In the case where the tire vibration resonance frequency is obtained as the reflected value based upon the vehicle speed, a phenomenon in which time-dependent fluctuations of the obtained resonance frequency are equal to or above a setting state arises due to the fact that the tire vibration frequency characteristic reflected by the vehicle wheel speed is not sufficiently peaked at the position of that resonance frequency, i.e. a resonance phenomenon does not conspicuously occur, signifying the possibility of a resulting difficulty in accurately obtaining the reflected value.

A third aspect of the invention relates to an apparatus for estimating a tire condition amount of that vehicle wheel provided in a vehicle equipped with first and second vehicle wheels, each formed with air enclosed under pressure in an inside portion of a tire mounted to a disc wheel. This apparatus includes a first wheel speed sensor that detects a first vehicle wheel speed of the first vehicle wheel and that is provided in relation to the first vehicle wheel; a second wheel speed sensor that detects a second vehicle wheel speed of the second vehicle wheel and that is provided in relation to each of the second vehicle wheel; and an estimating unit. The estimating unit obtains a reflected value reflecting a tire condition amount of the second vehicle wheel for which it is relatively easy to accurately obtain the reflected value of the second vehicle wheel based upon the detected second vehicle wheel speed, relative to the first vehicle wheel, during a first period corresponding to a second period in which it is relatively difficult to obtain a reflected value reflecting a tire condition amount of the first vehicle wheel based upon the first vehicle wheel speed, and estimates the reflected value of the first vehicle wheel based on the obtained reflected value of the second vehicle wheel, and estimates the tire condition amount of the first vehicle wheel based upon the estimated reflected value of the first vehicle wheel.

According to the third aspect, the tire condition amount of the first vehicle wheel can be obtained based on the obtained reflected value of the second vehicle wheel during the first period corresponding to the second period in which it is relatively difficult to obtain the reflected value of the first vehicle.

A fourth aspect of the invention relates to a method that estimates a tire condition amount of a vehicle wheel formed with air enclosed under pressure in an inside portion of a tire mounted to a disc wheels. The method includes the steps of detecting a vehicle wheel speed of each of a plurality of vehicle wheel, obtaining a reflected value reflecting a tire condition amount of each of the plurality of vehicle wheels based on the detected vehicle wheel speed corresponding to each of the plurality of vehicle wheels, estimating a reflected value of a first vehicle wheel for which it is relatively difficult to accurately obtain the reflected value based upon a vehicle wheel speed of the first vehicle wheel among the plurality of vehicle wheels, during a first period corresponding to a second period for obtaining the reflected value of the first vehicle wheel, based upon a reflected value obtained for a second vehicle wheel for which it is relatively easy to accurately obtain the reflected value based upon a vehicle wheel speed of the second vehicle wheel in order to obtain the reflected value of the first vehicle wheel, and estimating the tire condition amount based upon the obtained reflected value.

A fifth aspect of the invention relates to a method that estimates a tire condition amount of a vehicle wheel formed with air enclosed under pressure in an inside portion of a tire mounted to a disc wheel. The method includes the steps of detecting a vehicle wheel speed of the vehicle wheel, obtaining a reflected value reflecting a tire condition amount of the vehicle wheel based upon the detected vehicle wheel speed, estimating the tire condition amount based upon the obtained reflected value, and determining that there is a high probability that the tire condition amount of the vehicle wheel is normal if it is relatively difficult to accurately obtain the reflected value based upon the detected vehicle wheel speed, and determining that there is a high probability that the tire condition amount of the vehicle wheel is abnormal if it is relatively easy to accurately obtain the reflected value based upon the detected vehicle wheel speed.

A sixth aspect of the invention relates to a method for estimating a tire condition amount of a vehicle wheel formed with air enclosed under pressure in an inside portion of a tire mounted on a disc wheel. This method includes the steps of detecting a first vehicle wheel speed of the first vehicle wheel; detecting a second vehicle wheel speed of the second vehicle wheel; obtaining a reflected value reflecting a tire condition amount of the second vehicle wheel for which it is relatively easy to accurately obtain the reflected value of the second vehicle wheel based upon the detected second vehicle wheel speed, relative to the first vehicle wheel, during a first period corresponding to a second period in which it is relatively difficult to obtain a reflected value reflecting a tire condition amount of the first vehicle wheel based upon the first vehicle wheel speed; estimating the reflected value of the first vehicle wheel based on the obtained reflected value of the second vehicle wheel; and estimating the tire condition amount of the first vehicle wheel based upon the estimated reflected value of the first vehicle wheel.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

A tire vibration is used when employing a tire vibration system as a method for estimating a tire pressure.

In a resonance frequency system that is a type of tire vibration system focusing on the fact that the tire vibration resonance frequency varies if the tire pressure varies, the tire pressure is estimated based upon a detected resonance frequency, where the resonance frequency is detected as the above-mentioned tire vibration characteristic based upon the vehicle wheel speed.

However, the intensity of a tire vibration phenomenon is generally dependent on the vehicle wheel speed or the vehicle speed, the load (for example, a vehicle wheel load) acting on a vehicle wheel, tire pressure, and the like.

For example, in a case where the above-described resonance frequency system is employed, the tire resonance phenomenon does not appear as conspicuously within a high speed region where a vehicle wheel speed or a vehicle speed is high, as in a low speed region. Further, the tire resonance phenomenon does not appear as conspicuously in a rear vehicle wheel with a relatively small vehicle wheel load, as in a front vehicle wheel with a relatively large vehicle wheel load. In addition, the tire resonance phenomenon does not appear as conspicuously when the tire pressure is a set pressure, as when the tire pressure is lower than the set pressure.

Graphs illustrating test data for describing this are shown in FIGS. 12 to 15.

Figure 12:
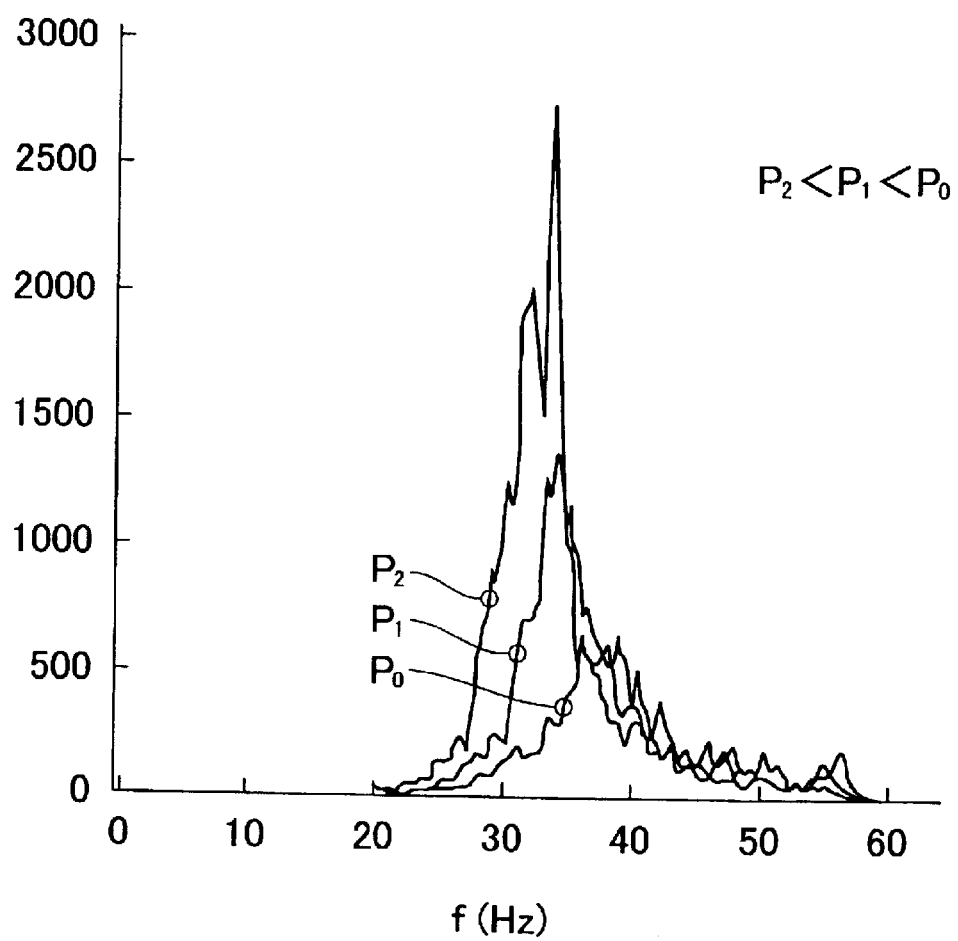
FIG. 12 is a graph illustrating a front-left vehicle wheel resonance frequency characteristic at each tire pressure in a state equivalent to a state where a vehicle is running at 60 km/h.
Figure 13:
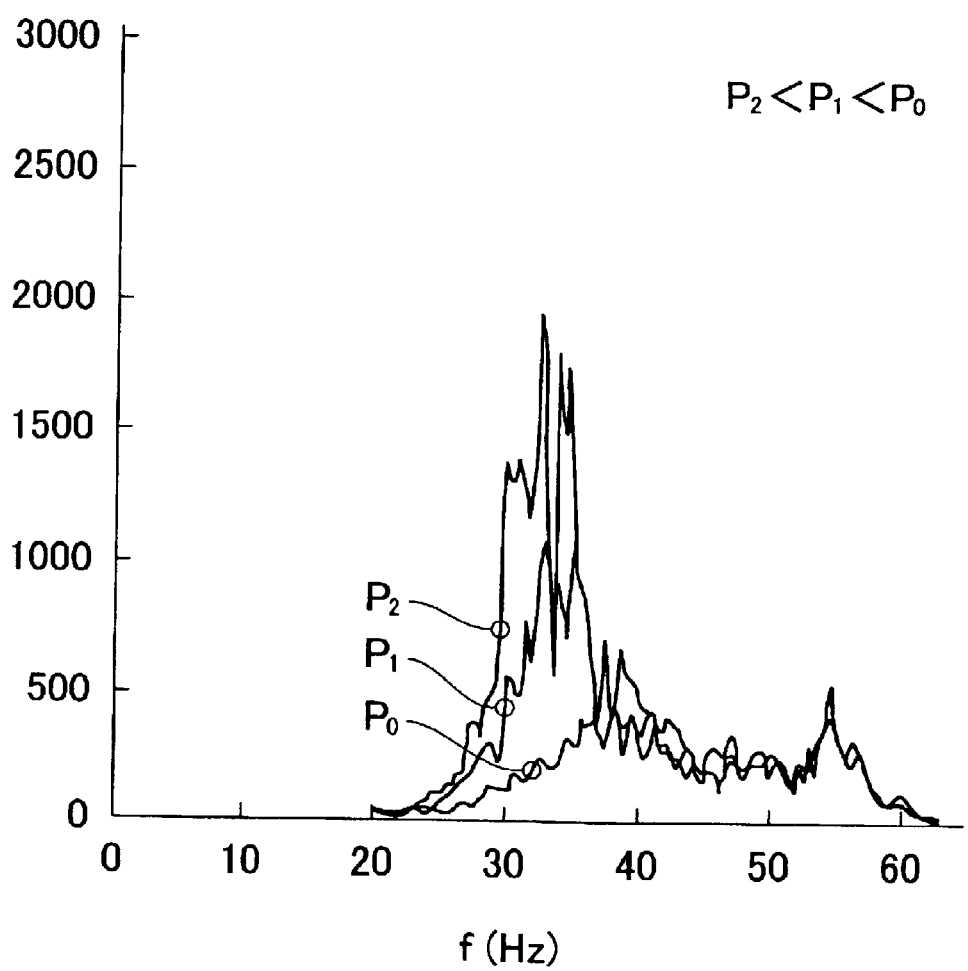
FIG. 13 is a graph illustrating a front-left vehicle wheel resonance frequency characteristic at each tire pressure in a state equivalent to a state where the vehicle is running at 90 km/h.

Various vibration frequency characteristics based upon vehicle wheel speeds of the front-left vehicle wheel are illustrated in FIGS. 12 and 13, when a tire pressure of the front-left vehicle wheel of the vehicle is either a set pressure $P_0$ (for example, 210 kPa), a lower air pressure P1 (for example, 145 kPa), or an even lower air pressure P2 (for example, 100 kPa).

However, FIG. 12 illustrates a vibration frequency characteristic in a state equivalent to a low speed running state where the vehicle is running at a speed of 60 km/h, and FIG. 13 illustrates a vibration frequency characteristic in a state equivalent to a high speed running state where the vehicle is running at a speed of 90 km/h.

As apparent in FIGS. 12 and 13, the tire resonance phenomenon of the front-left vehicle wheel conspicuously appears with the vibration frequency characteristic clearly emerging as a peak in a position corresponding to a resonance frequency irrespective of whether the vehicle is running in a high speed region, or whether the tire pressure is equal to or lower than the set pressure.

Figure 14:
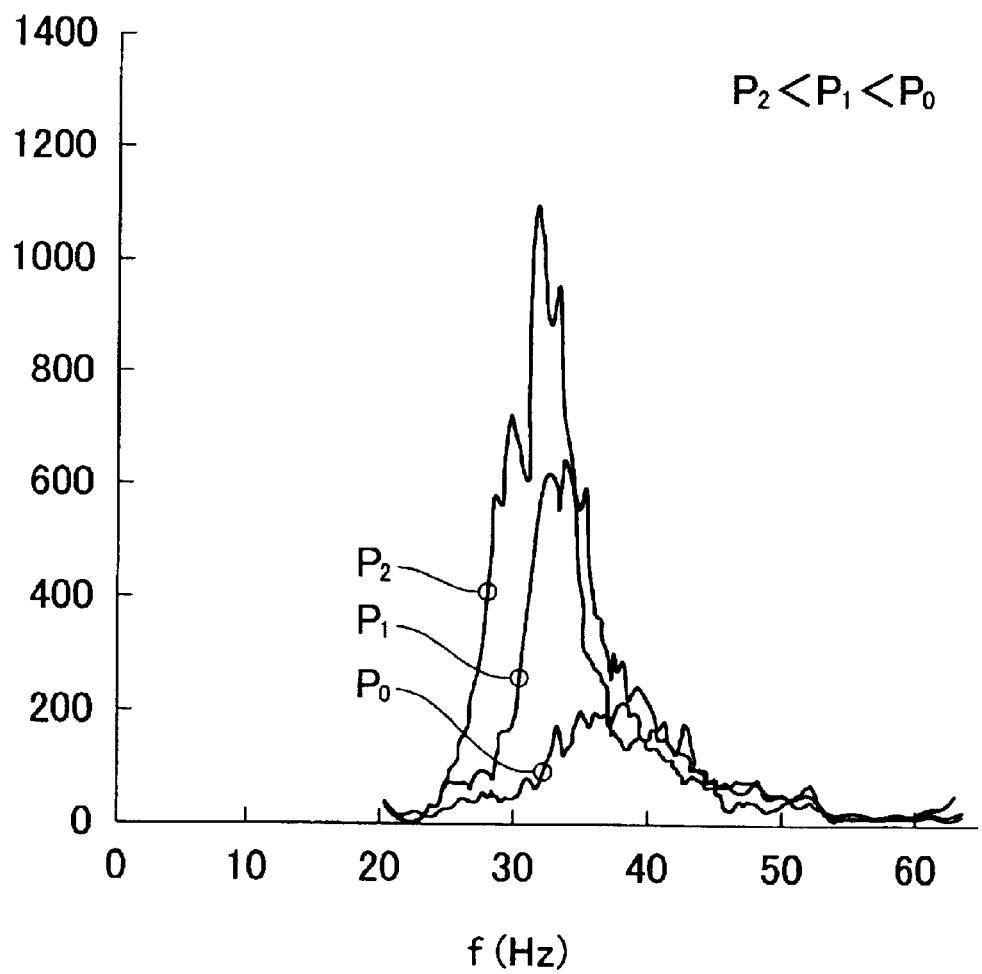
FIG. 14 is a graph illustrating a rear-left vehicle wheel resonance frequency characteristic at each tire pressure in a state equivalent to a state where the vehicle is running at 60 km/h.
Figure 15:
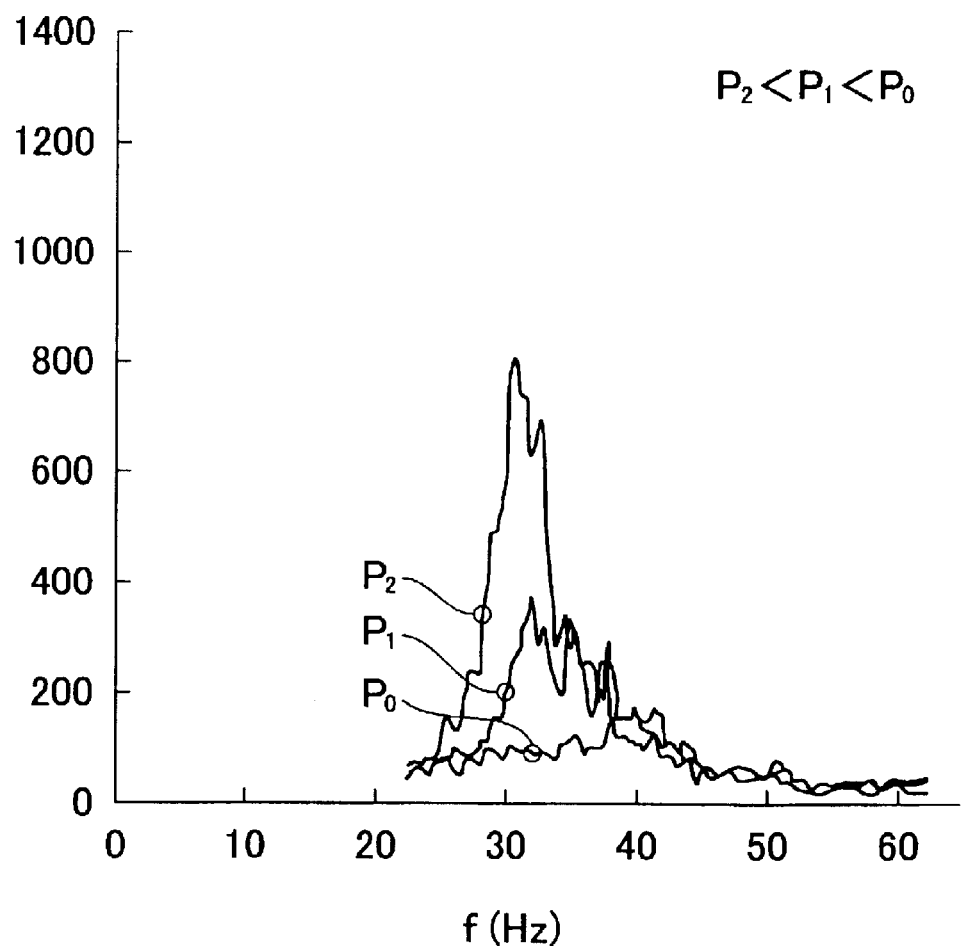
FIG. 15 is a graph illustrating a rear-left vehicle wheel resonance frequency characteristic at each tire pressure in a state equivalent to a state where the vehicle is running at 90 km/h.

Meanwhile, a vibration frequency characteristic based upon vehicle wheel speeds of the rear-left vehicle wheel is illustrated in FIGS. 14 and 15, when a tire pressure of the rear-left vehicle wheel of the same vehicle is either a set pressure $P_0$ (for example, 210 kPa), a lower air pressure P1 (for example, 145 kPa), or an even lower air pressure P2 (for example, 100 kPa).

However, FIG. 14 illustrates a vibration frequency characteristic in a state equivalent to a low speed running state where the vehicle is running at a speed of 60 km/h, and FIG. 15 illustrates a vibration frequency characteristic in a state equivalent to a high speed running state where the vehicle is running at a speed of 90 km/h.

As apparent in FIGS. 14 and 15, the tire resonance does not conspicuously appear in the rear-left vehicle wheel when the vehicle speed is in a high speed region and the tire pressure is at the set pressure, and the vibration frequency characteristic is almost completely flat in a position corresponding to the resonance frequency.

On the contrary, the tire resonance phenomenon conspicuously appears and the vibration frequency characteristic clearly emerges as a peak in a position corresponding to the resonance frequency when the vehicle speed is in a high speed region and the tire pressure is lower than the set pressure. In addition, when the vehicle speed is in a low speed region, the vibration frequency characteristic clearly emerges as a peak irrespective of whether the tire pressure is equal to or lower than the set pressure.

Thus, when the vehicle speed is in a high speed region and the tire pressure is a set pressure, the tire resonance phenomenon does not conspicuously appear in the rear vehicle wheel and the vibration frequency characteristic becomes almost completely flat in a position corresponding to the resonance frequency. Causes of this are speculated hereinbelow.

In order for the tire resonance phenomenon to conspicuously appear, greatly bending the tire at a contact area where the tire is in contact with a road surface while the vehicle is running is necessary. The bending amount of the tire decreases as the rotational speed of the tire becomes faster, and also as the vehicle wheel load perpendicularly acting on the vehicle wheel becomes smaller. Since the vehicle wheel load has a strong tendency to be smaller in the rear vehicle wheel than in the front vehicle wheel, it is relatively harder for the tire resonance phenomenon to conspicuously appear in the rear vehicle wheel than in the front vehicle wheel. In addition, tire rigidity increases as tire pressure increases, thereby decreasing the tire bending amount, which is also speculated as one of the above-mentioned causes.

Hereinafter, embodiments according to the invention will be described in detail with reference to the accompanying drawings.

Figure 1:
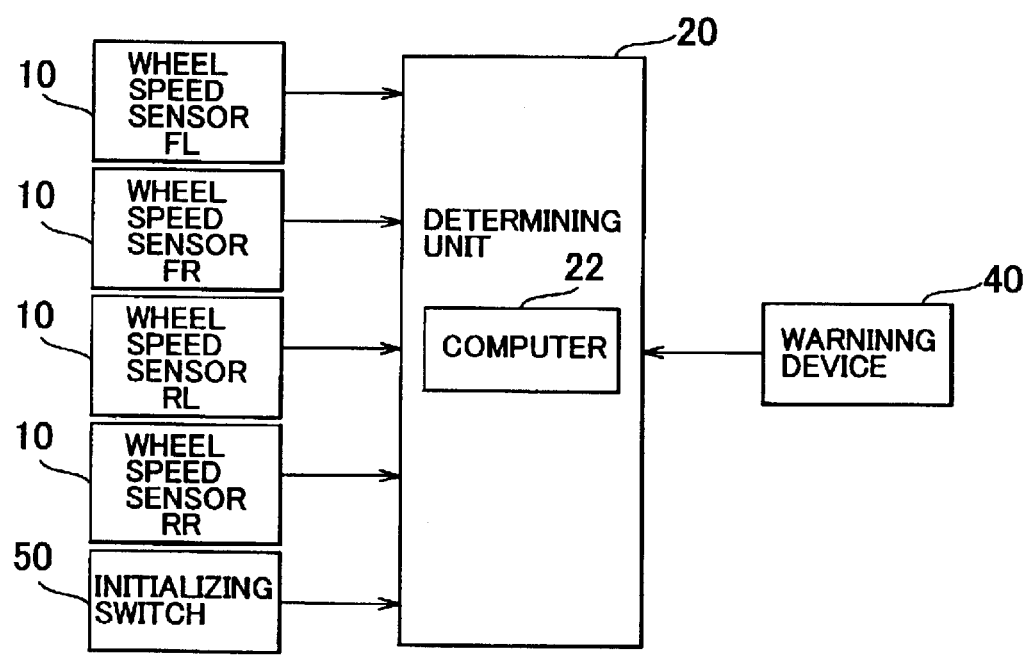
FIG. 1 is a block view illustrating a hardware structure of a tire abnormality determining device according to a first embodiment of the invention.

FIG. 1 conceptually illustrates a block view of a hardware structure of a tire abnormality determining device according to a first embodiment of the invention. This tire abnormality determining device is mounted in a vehicle.

Four vehicle wheels are totally provided for the vehicle at the front, rear, left, and right sides thereof, respectively. In FIG. 1, "FL" designates a front-left vehicle wheel, "FR" designates a front-right vehicle wheel, "RL" designates a rear-left vehicle wheel, and "RR" designates a rear-right vehicle wheel. In the embodiment, a relatively large load acts perpendicularly on the front vehicle wheels, and a relatively small load acts perpendicularly on the rear vehicle wheels. Therefore, the front wheels can be considered as high-load vehicle wheels of the invention, and the rear wheels can be considered as low-load vehicle wheels of the invention.

As is well known, each vehicle wheel is formed of a metal made disc wheel and a rubber made tire mounted to the disc wheel. An inner space of the tire is filled with air under pressure.

As shown in FIG. 1, this tire abnormality determining device is equipped with a wheel speed sensor 10 for each vehicle wheel. Each wheel speed sensor 10, as is well known, is a sensor that detects the angular speed of each vehicle wheel as a vehicle wheel speed. More specifically, the wheel speed sensor 10 is a magnetic pick-up and outputs an electric voltage signal which varies periodically corresponding to passing of a plurality of teeth formed along an outer periphery of a rotor rotatable with the vehicle wheel.

As shown in FIG. 1, the four wheel speed sensors 10 are electrically connected to a determining unit 20. The determining unit 20 is provided with a computer 22 as a main body and is employed for determining whether the tire pressure (an example of the aforementioned tire condition amounts) of each vehicle wheel is abnormally low based upon the output signals of the four wheel speed sensors 10. In addition, a low tire pressure can also be considered as a large tire deformation amount.

In the following description, the term, tire abnormality, will designate that tire pressure is abnormally low.

Figure 2:
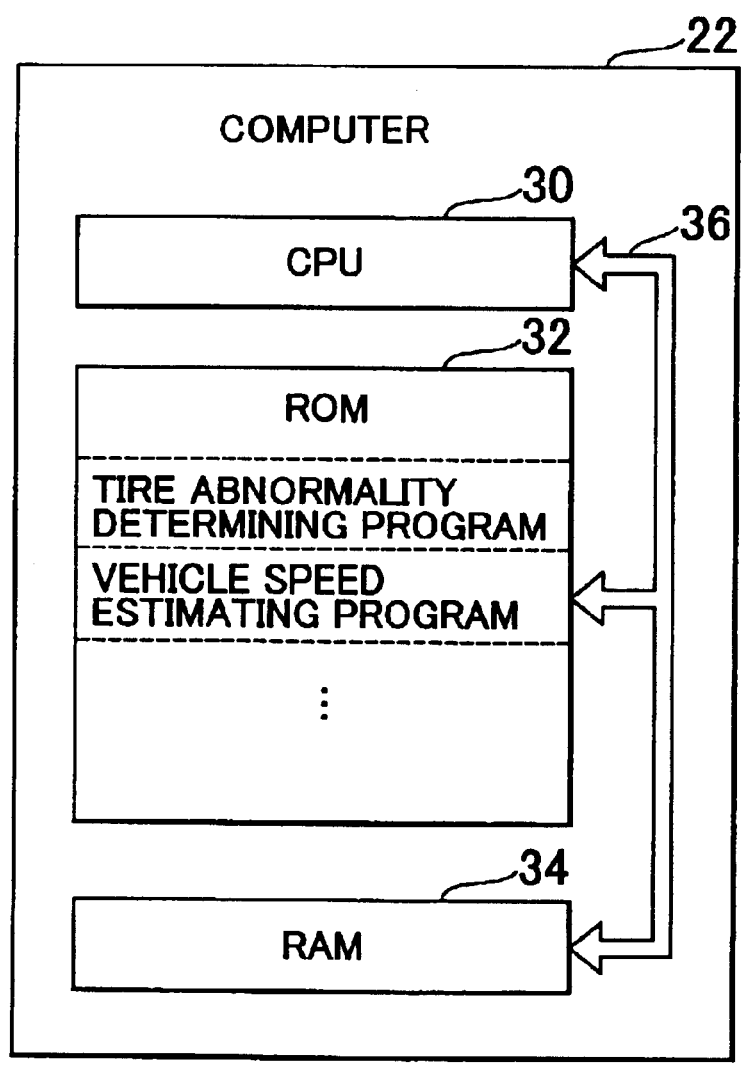
FIG. 2 is a block view illustrating a hardware structure of a computer illustrated in FIG. 1.

FIG. 2 is a block view conceptually illustrating a hardware structure of the computer 22. As well known, the computer 22 is provided with a CPU 30 (an example of a processor), a ROM 32 (an example of a memory), and a RAM 34 (an example of a memory) which are all connected via a bus 36. A rewritable nonvolatile storage portion (not shown) is provided in the ROM 32. An example of that nonvolatile storage portion is an EEPROM or a Flash ROM.

As shown in FIG. 2, the ROM 32 memorizes in advance various programs including a tire abnormality determining program and a vehicle speed estimating program.

As is well known, the vehicle speed estimating program is a program for estimating a vehicle speed based upon a plurality of vehicle wheel speeds detected by a plurality of wheel speed sensors 10.

The tire abnormality determining program is a program executed to determine whether the tire of each vehicle wheel is abnormal. Further details regarding this tire abnormality determining program will be described later on.

As shown in FIG. 1, the determining unit 20 is further connected to a warning device 40. The warning device 40 is activated in order to auditorily or visibly alert a driver of the vehicle that a vehicle wheel with abnormally low tire pressure is present among the plural vehicle wheels. The warning device 40 is also capable of being designed to provide predetermined data to the vehicle driver regarding the location of the vehicle wheel determined from among the plural vehicle wheels as having abnormally low tire pressure.

If structured in a configuration to visibly announce data, it is possible to structure this warning device 40 as an exclusive warning light, or a multi-display that selectively displays a plurality of different data in the same display position.

As shown in FIG. 1, an initializing switch 50 is further connected to the determining unit 20. Through activation of this initializing switch 50 by a user of the vehicle (including the driver), an initialization command for commanding the determining unit 20 to perform initialization of an air pressure detecting characteristic regarding the determining unit 20 is output to the determining unit 20.

This initializing switch 50, for example, is activated by the vehicle user if tires of the vehicle have been replaced. At this activation time, it is appropriate to assume the tire pressures of all the vehicle wheels are equivalent to the respective set pressures. Consequently, the set pressures for the front right and left vehicle wheels are equivalent, and the set pressures for the rear right and left vehicle wheels are equivalent. However, the set pressures for the front and rear vehicle wheels may be different.

The content of the aforementioned tire abnormality determining program will now be described in detail.

In the embodiment, this tire abnormality determining program is structured so as to include an initializing routine for initializing a determining condition of the tire pressure (determining an initial value mentioned later), and a determining routine for determining whether a tire pressure is lower than a reference value using that initial value.

Figure 3:
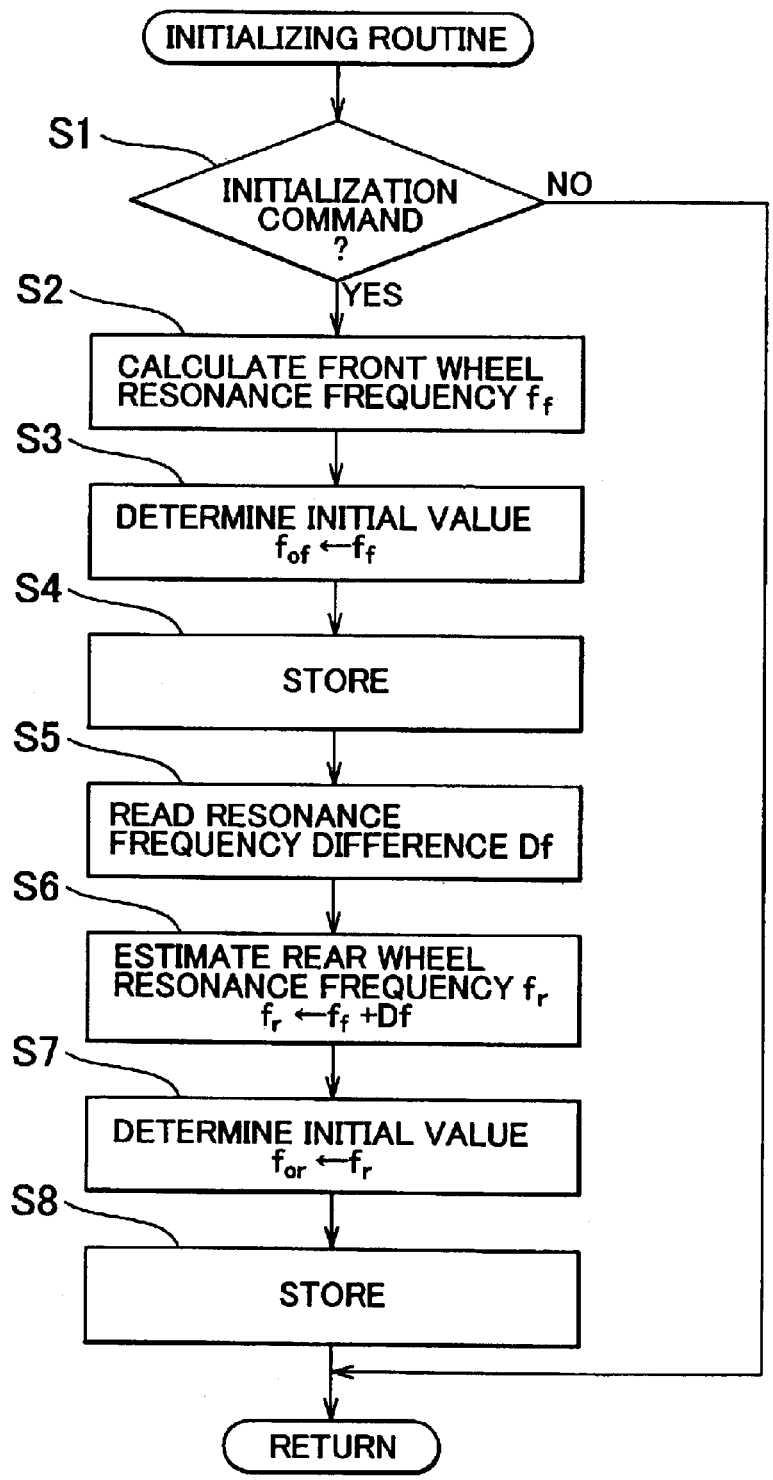
FIG. 3 is a flow chart conceptually representing the content of an initializing routine within the tire abnormality determining program illustrated in FIG. 2.

In FIG. 3, the content of the initializing routine is conceptually illustrated in a flow chart. This initializing routine is repeatedly executed while the computer 22 is on.

During each time the initializing routine is executed, first, in step S1, it is determined whether the initialization command in response to the activation of initializing switch 50 has been made. If the initialization command has not been made, the determination becomes NO in step S1, and one execution of this initializing routine is immediately completed.

On the other hand, if the initialization command has been made, the determination in step S1 becomes YES, and the process proceeds to step S2. In step S2, a tire vibration resonance frequency $f_f$ (an example of the aforementioned reflected value) is calculated based upon the vehicle wheel speed signal for each front right and left vehicle wheel from the corresponding wheel speed sensors 10. In the embodiment, the front vehicle wheels are an example of the aforementioned vehicle wheel for which a reflected value is easy to obtain.

Afterwards in step S3, the resonance frequency $f_f$ thus calculated regarding each front vehicle wheel is determined as the resonance frequency initial value $f_{0f}$ for each front vehicle wheel. This initial value $f_{0f}$ is a factor for estimating and determining the tire pressure of each front vehicle wheel.

Subsequently in step S4, the determined initial value $f_{0f}$ for each vehicle wheel is stored in the nonvolatile storage portion.

Afterwards in step S5, the resonance frequency difference Df is read from the ROM 32. This resonance frequency difference Df is a difference that is presumed to be present between the tire vibration resonance frequency of a rear vehicle wheel and the tire vibration resonance frequency of a front vehicle wheel in circumstances where the tire pressures of the front and rear vehicle wheels are equivalent to the respective set pressures for the vehicle wheels, and is stored in advance in the ROM 32 of the vehicle before shipping.

Namely, in the embodiment, a circumstance where the tire pressures of the front and rear vehicle wheels are respectively equivalent to set pressures is an example of the aforementioned predetermined tire condition amount relationship, and the resonance frequency difference Df is an example of the aforementioned predetermined reflected value difference.

Figure 4:
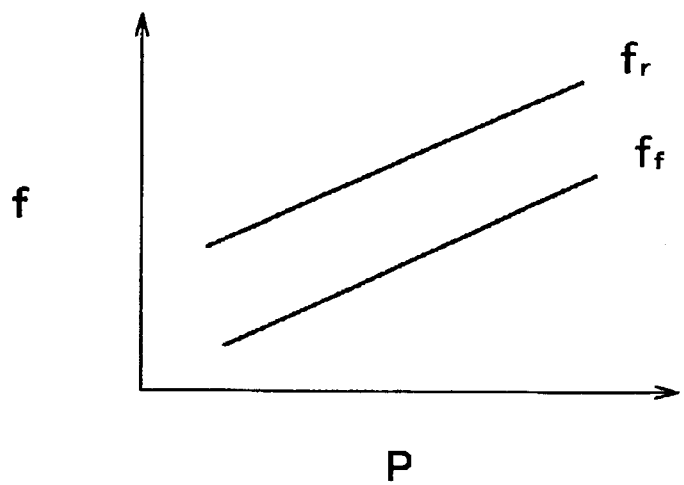
FIG. 4 is a graph for describing a relationship between a resonance frequency $f_f$ of a front vehicle wheel and a resonance frequency $f_r$ of a rear vehicle wheel illustrated in FIG. 3.

In FIG. 4, characteristics of the resonance frequency f against a tire pressure P are conceptually illustrated in a graph as "$f_f$" for the front vehicle wheel and "$f_r$" for the rear vehicle wheel respectively.

Figure 5:
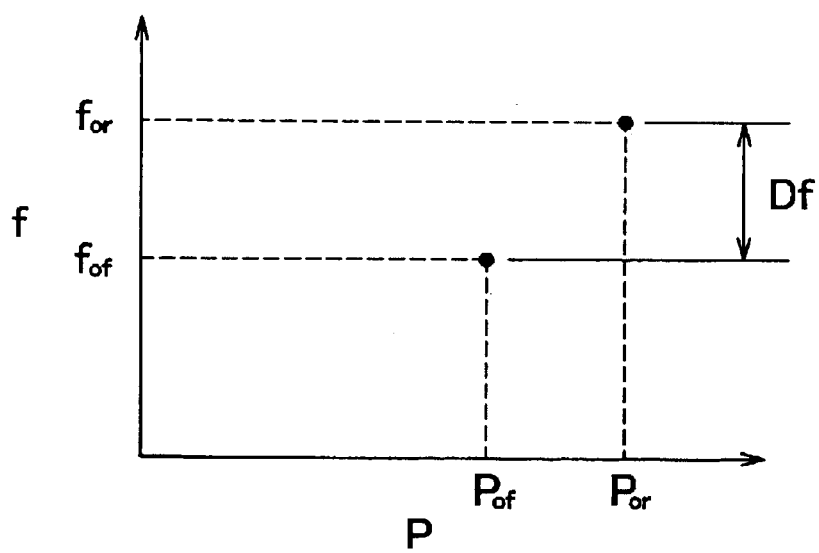
FIG. 5 is a graph for describing a resonance frequency difference Df illustrated in FIG. 3.

In FIG. 5, the relationship among the resonance frequency $f_{0f}$ when the tire pressure of the front vehicle wheel is a set pressure $P_{0f}$, the resonance frequency for when the tire pressure of the rear vehicle wheel is a set pressure $P_{0r}$, and the resonance frequency difference Df is conceptually illustrated in a graph.

After executing step S5, in step S6 the resonance frequency $f_r$ of each rear vehicle wheel is estimated based upon the resonance frequency difference Df read in step S5 and the calculated resonance frequency $f_f$ of the front vehicle wheel. In the embodiment, the rear vehicle wheels are an example of the aforementioned vehicle wheels for which a reflected value is difficult to obtain.

In step S6, for example, an average value of the resonance frequencies $f_r$ among the front right and left vehicle wheels is calculated as one resonance frequency representing the two resonance frequencies $f_f$ of the front right and left vehicle wheels. That average value is then used in common among the rear right and left vehicle wheels.

Further in step S6, for example, a resonance frequency $f_r$ of the rear vehicle wheels is estimated as the sum of the resonance frequency difference Df (a positive or negative value) and the resonance frequency $f_f$ of the front vehicle wheels.

Afterwards in step S7, the thus estimated resonance frequency $f_r$ of the rear vehicle wheels is determined as a resonance frequency initial value $f_{0r}$ for each rear vehicle wheel. This initial value for is a factor for estimating and determining the tire pressure of each rear vehicle wheel.

Subsequently in step S8, the determined initial value $f_{0r}$ for each rear vehicle wheel is stored in the nonvolatile storage portion.

An execution of the initializing routine is herein completed.

Figure 6:
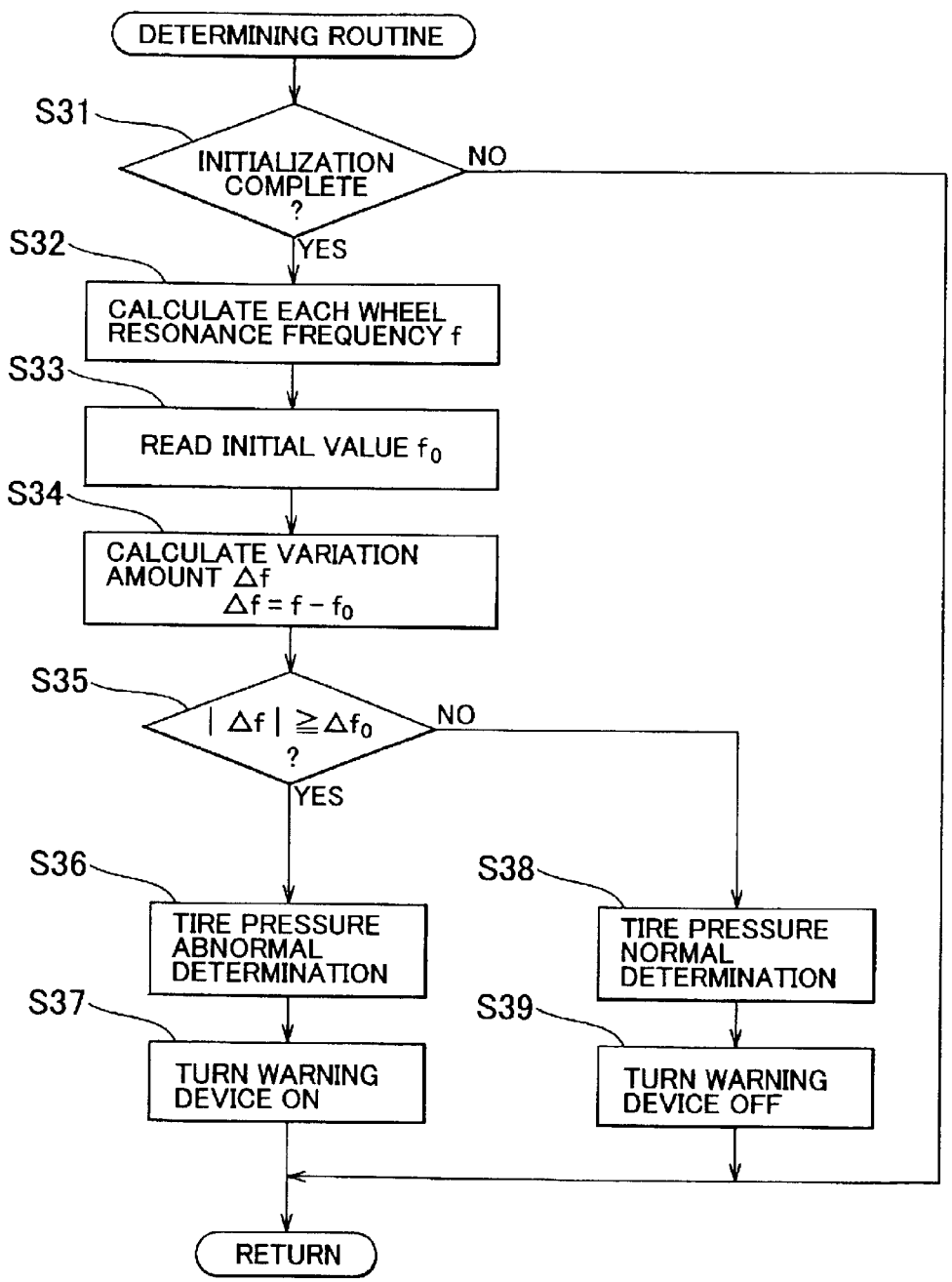
FIG. 6 is a flow chart conceptually representing the content of a determining routine in the tire abnormality determining program illustrated in FIG. 2.

In FIG. 6, a flow chart conceptually illustrates the content of the aforementioned determining routine. This determining routine is repeatedly executed while the computer 22 is on.

During each execution of the determining routine, first, in step S31 it is determined whether a current initialization by the initializing routine has been completed. If the determining routine is not completed, then the determination in step S31 becomes NO, and one execution of this determining routine is immediately completed. If the current initialization has been completed, then the determination in step S31 becomes YES, and the resonance frequency f is calculated in step S32 based upon the vehicle wheel speed signals from the wheel speed sensors 10 corresponding to each vehicle wheel.

Subsequently in step S33, the initial value $f_0$ for each vehicle wheel is read from the nonvolatile storage portion.

Afterwards in step S34, a variation amount $\Delta f$ from the initial value $f_0$ ($f_{0f}$ and $f_{0r}$ obtained in step S3 and step S7) corresponding to the calculated resonance frequency f for each vehicle wheel is calculated.

Subsequently in step S35, it is determined whether an absolute value of the calculated variation amount $\Delta f$ for each vehicle wheel is equal to or above a threshold value $\Delta f_0$.

If the absolute value of the variation amount $\Delta f$ for a given vehicle wheel is determined to be equal to or above the threshold value $\Delta f_0$, the determination in step S35 becomes YES, the tire pressure for the vehicle wheel is determined as abnormal in step S36, and the warning device 40 to alert the driver is turned ON in step S37. An execution of the determining routine is herein completed.

On the other hand, if the absolute value of the variation amount $\Delta f$ for a given vehicle wheel is determined as not being equal to or above the threshold value $\Delta f_0$, the determination in step S35 becomes NO, the tire pressure of the vehicle wheel is determined as normal in step S38, and the warning device 40 to alert the driver is turned OFF in step S39. An execution of the determining routine is herein completed.

As apparent from the above description, in the embodiment, the tire abnormality determining device can be considered as a "tire condition amount estimating device" of the invention, and the determining unit 20 can be considered as an "estimating unit" of the invention.

Next, a second embodiment of the invention will be described. However, the hardware structure of the second embodiment is in common with the first embodiment, and excluding the determining routine, the software structure is in common. Therefore, a detailed description regarding common factors will be omitted through the usage and citation of identical names and reference numerals, and only factors not in common will be described in detail.

In the determining routine of the first embodiment, a special measure is not adopted for circumstances where it is difficult to accurately calculate the resonance frequency of a rear vehicle wheel for reasons such as the vehicle speed in a high speed region, after initialization is complete.

When the vehicle speed is in a high speed region and the tire pressure of the rear vehicle wheels in the vehicle are equivalent to a set pressure, it is difficult to accurately obtain a resonance frequency of the rear vehicle wheels because the resonance phenomenon is not conspicuous.

Based upon this fact, the determining routine of the first embodiment is designed so as to determine the tire pressure of the rear vehicle wheel as normal when it is difficult to accurately calculate the resonance frequency of that rear vehicle wheel.

Figure 7:
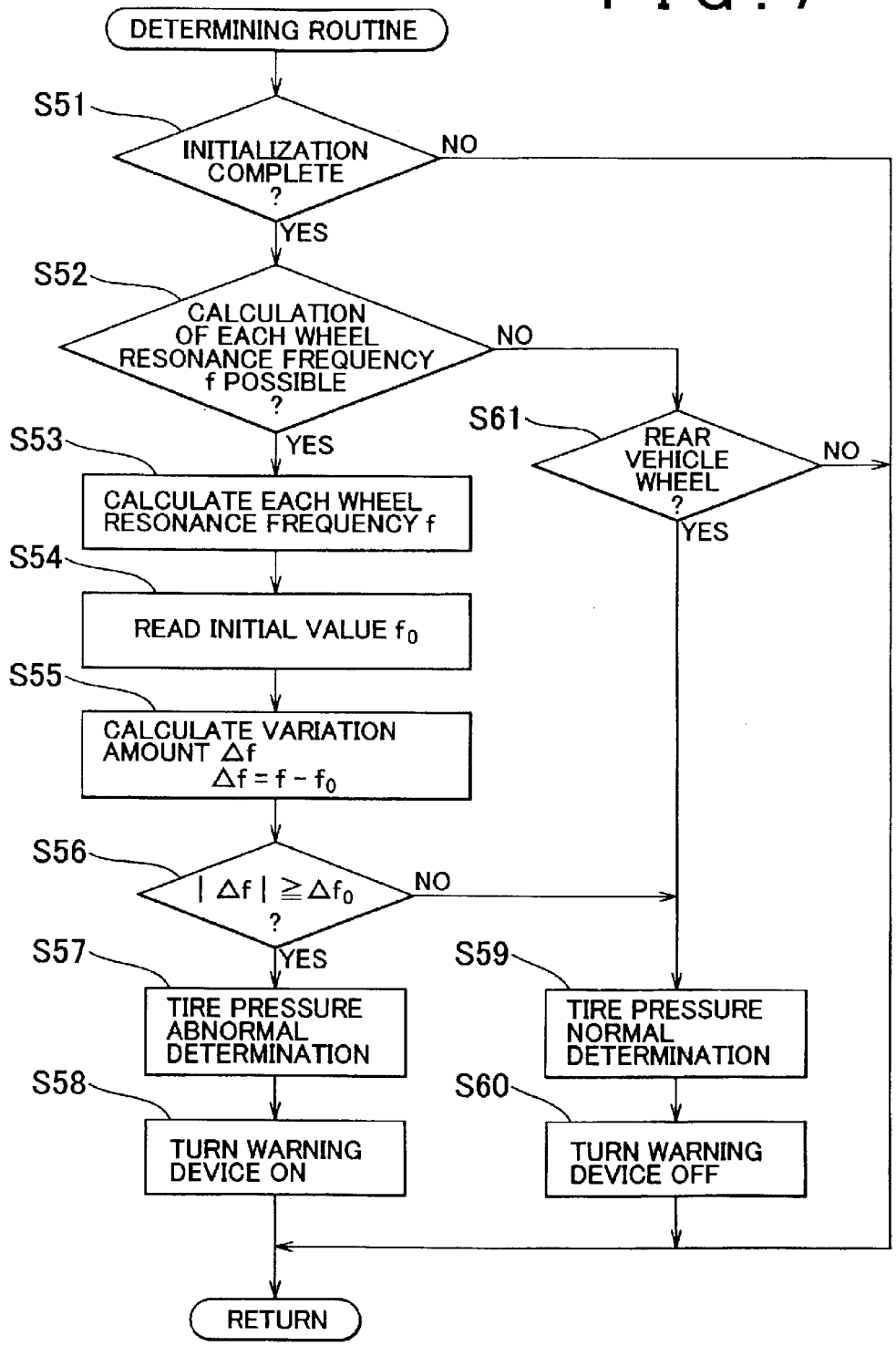
FIG. 7 is a flow chart conceptually representing the content of a determining routine in a tire abnormality determining program in a tire abnormality determining device according to a second embodiment of the invention.

FIG. 7 conceptually illustrates the content of a determining routine of the embodiment in a flowchart. Hereinafter, this determining routine will be described with steps in common with the determining routine of the first embodiment described in brief.

During each time the determining routine of the embodiment is executed, first, in step S51, it is determined whether the current initialization has been completed as in step S31. If the current initialization has been completed, then the determination in step S51 becomes YES, and the process proceeds to step S52.

In step S52, it is determined whether the resonance frequency f for each vehicle wheel can be accurately calculated based upon the vehicle wheel speed signal from the corresponding wheel speed sensors 10. This determination designates a determination of whether each vehicle wheel is a vehicle wheel for which a resonance frequency is easier to obtain or a vehicle wheel for which a resonance frequency is more difficult to obtain. It is also possible to execute this determination through various methods.

Figure 8:
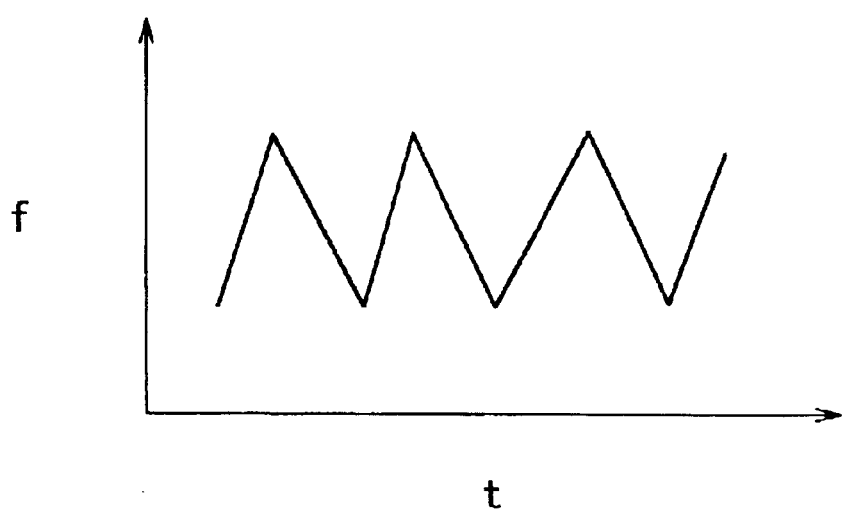
FIG. 8 is a graph for conceptually describing the execution content of S52 illustrated in FIG. 7.

According to the method of step S52, the resonance frequency f is consecutively calculated for each vehicle wheel based upon the corresponding vehicle wheel speed signal. Further, since the calculated resonance frequency f, for example, as shown in FIG. 8, varies greatly with respect to time, the vehicle wheel is determined as a vehicle wheel for which a resonance frequency is difficult to obtain if the time-dependent variation amount of the resonance frequency f (for example, the difference between the resonance frequency f value of the previous execution and the current execution) is equal to or above a set value at two or more times in a row.

If each vehicle wheel is not a vehicle wheel for which a resonance frequency is difficult to obtain, then the determination in step S52 becomes YES, and the following steps S53 to S60 are executed in a manner identical to steps S32 to S39 in FIG. 6.

On the other hand, if a vehicle wheel is a vehicle wheel for which a resonance frequency is difficult to obtain, the determination in step S52 becomes NO, and in step S61 it is determined whether that vehicle wheel is a rear vehicle wheel. If it is a rear vehicle wheel, then the determination becomes YES, and in step S59 the tire pressure of the rear vehicle wheel is determined as normal. In step S60 the warning device 40 for alerting the driver is turned OFF. An execution of the determining routine is herein completed.

On the contrary, if the vehicle wheel is not a rear vehicle wheel, the determination in step S61 becomes NO, and one execution of this determining routine is immediately completed.

As apparent in the above description, in the embodiment, the determining unit 20 can be considered as an "estimating unit" of the invention.

Next, a third embodiment of the invention will be described. However, the hardware structure of the first embodiment and the second embodiment is in common with this embodiment, and excluding the initializing routine, the software structure is in common. Therefore, a detailed description of common factors will be omitted through the usage and citation of identical names and reference numerals, and only factors not in common will be described in detail.

In the initializing routines of the first and the second embodiments, the resonance frequency initial value $f_{0r}$ of the rear vehicle wheels is estimated using the resonance frequency $f_f$ detected from the front vehicle wheels without determining whether it is difficult to accurately obtain, detect, and calculate the resonance frequency $f_r$ of the rear vehicle wheels based upon the vehicle wheel speed.

On the contrary, in the initializing routine of this embodiment, it is determined whether it is difficult to accurately obtain the resonance frequency $f_r$ of the rear vehicle wheels based upon the vehicle wheel speed, and if it is not difficult, the resonance frequency $f_r$ of the rear vehicle wheels is calculated based upon the vehicle wheel speed, which is then made the resonance frequency initial value $f_{0r}$. Meanwhile, as long as the resonance frequency $f_r$ of the rear vehicle wheels is difficult to obtain, the resonance frequency initial value for is estimated using the resonance frequency $f_f$ detected from the front vehicle wheels.

Figure 9:
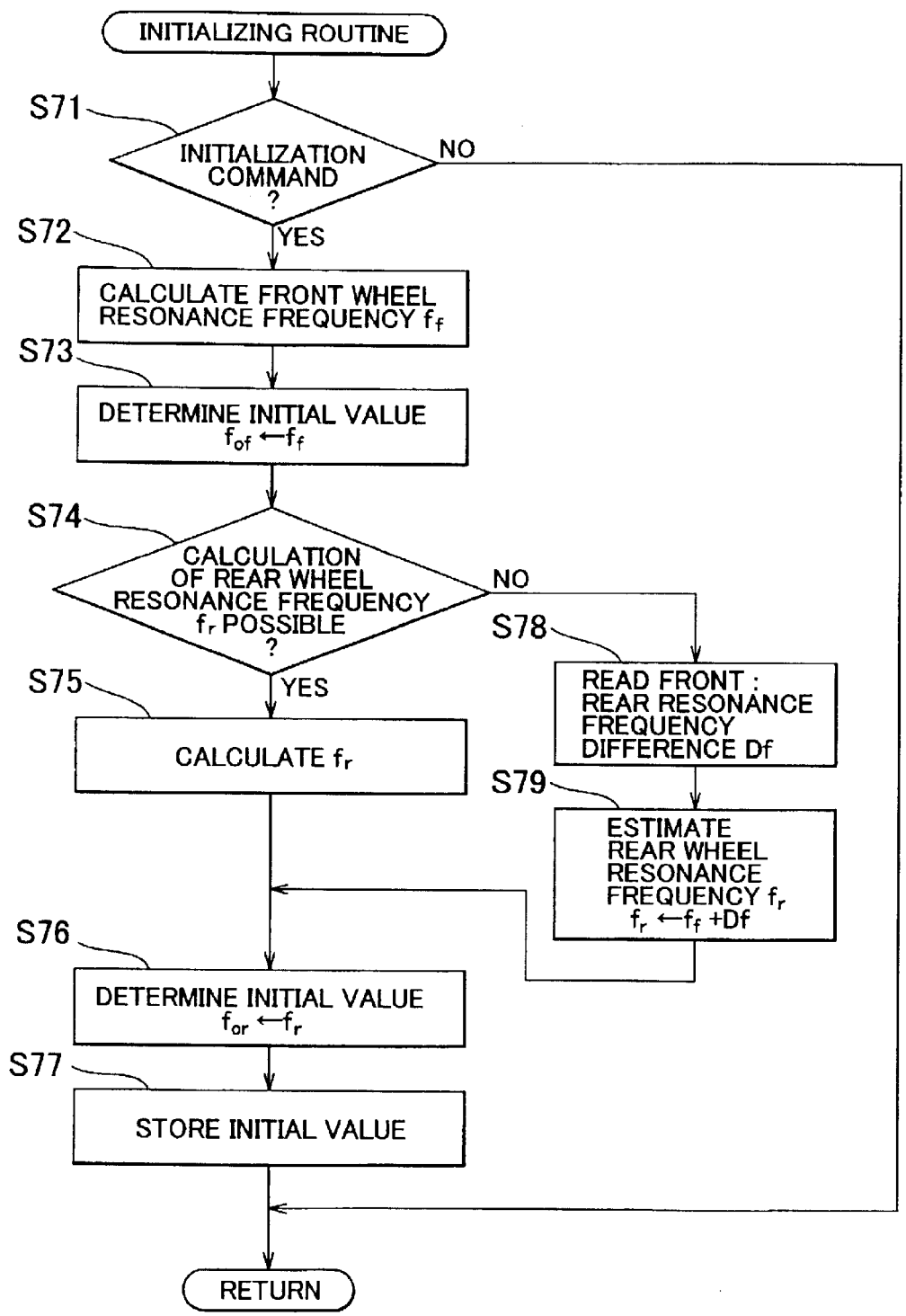
FIG. 9 is a flow chart conceptually representing the content of an initializing routine in a tire abnormality determining program of a tire abnormality determining device according to a third embodiment of the invention.

FIG. 9 conceptually illustrates the content of an initializing routine of the embodiment in a flow chart. Hereinafter, this initializing routine will be described, with steps in common with the initializing routines of the first and second embodiments described in brief.

During each time the determining routine of the embodiment is executed, first, steps S71 to S73 are implemented in a manner identical to steps S1 to S3 in FIG. 3. Thus, the resonance frequency initial value $f_{0f}$ of the front vehicle wheels is determined.

Subsequently, in step S74 it is determined whether it is possible to accurately calculate the resonance frequency $f_r$ of the rear vehicle wheels, i.e. whether the rear vehicle wheel is a vehicle wheel for which a resonance frequency is easy to obtain. Even when the tire pressure of the rear vehicle wheel is equivalent to the set pressure, if the vehicle speed is in a low speed region, it is easy to accurately detect the resonance frequency $f_r$ of the rear vehicle wheels. Step S74 is executed in a manner identical to step S52 in FIG. 7.

If the rear vehicle wheel is determined as a vehicle wheel for which a resonance frequency is easy to obtain in step S74, the determination in step S74 becomes YES, and the resonance frequency $f_r$ of the rear vehicle wheels is calculated based upon the corresponding vehicle speed in step S75. On the contrary, if the rear vehicle wheel is determined as a vehicle wheel for which a resonance frequency is difficult to obtain, the determination in step S74 becomes NO, and steps S78 and S79 are executed in a manner identical to steps S5 and S6 in FIG. 3.

In either case, steps S76 and S77 are afterwards executed in a manner identical to steps S7 and S8 in FIG. 3. An execution of the initializing routine is herein completed.

As apparent from the above description, in the embodiment, the determining unit 20 can be considered as an "estimating unit" of the invention.

Next, a fourth embodiment of the invention will be described However, the hardware structure of the first embodiment is in common with this embodiment, and excluding the tire abnormality determining program, the software structure is in common. Therefore, a detailed description regarding common factors will be omitted through the usage and citation of identical names and reference numerals, and only factors not in common will be described in detail.

In the tire abnormality determining program of the first embodiment, it is necessary to initialize a determining condition in order to determine the tire pressure. However, in this embodiment, the tire pressure of the rear vehicle wheels is determined without such initialization.

Specifically, the embodiment focuses on the fact that it is possible that the tire pressure of the rear vehicle wheel being equivalent to a set pressure is the cause when the rear vehicle wheel is a vehicle wheel for which a resonance frequency is difficult to obtain, i.e. a vehicle for which a resonance frequency is difficult to accurately calculate based upon the corresponding vehicle wheel speed. Therefore, in the case where the rear vehicle wheel is a vehicle wheel for which a resonance frequency is difficult to obtain, it is immediately determined that the tire pressure of the rear vehicle wheel is equivalent to a set pressure and normal.

However, as in the first embodiment, it is necessary to initialize the determining condition of the front vehicle wheels in order to determine the tire pressure.

Therefore, in the embodiment, the tire abnormality determining program is structured so as to include a front vehicle wheel determining routine (not shown) that implements initialization to determine the tire pressure of the front vehicle wheel, and a rear vehicle wheel determining routine that does not implement initialization to determine the tire pressure of the rear vehicle wheel.

Figure 10:
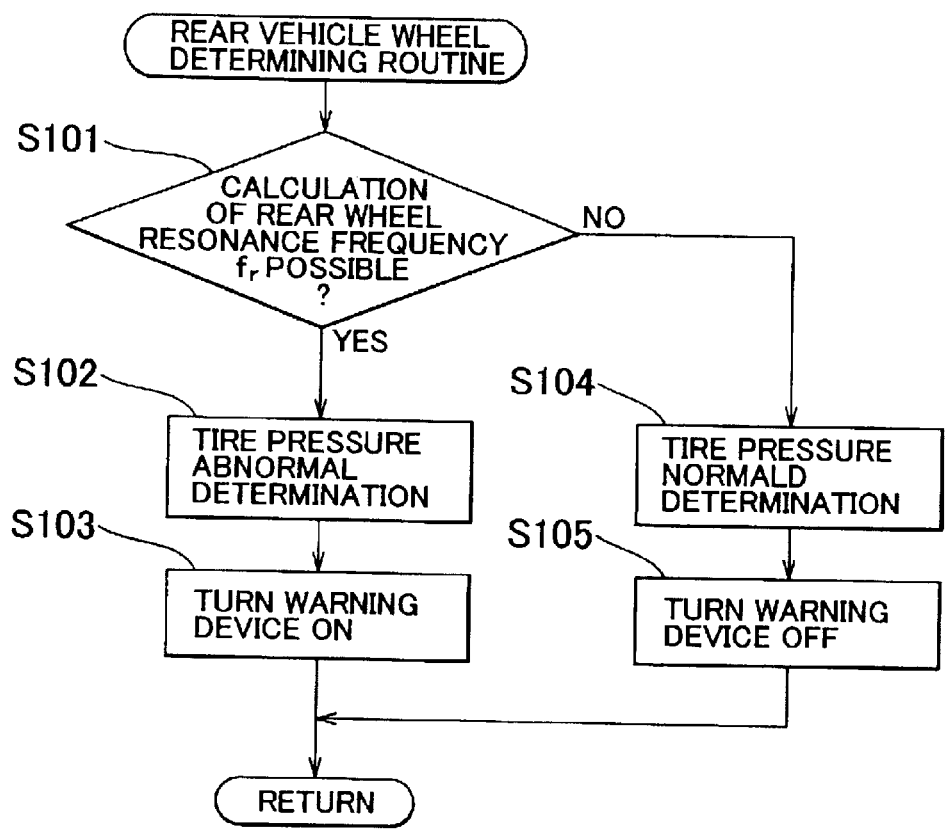
FIG. 10 is a flow chart conceptually representing the content of a rear vehicle wheel determining routine in a tire abnormality determining program of a tire abnormality determining device according to a fourth embodiment of the invention.

FIG. 10 conceptually illustrates the content of the rear vehicle wheel determining routine of the embodiment in a flow chart. Hereinafter, this rear vehicle wheel determining routine will be described with steps in common with the determining routine of the first embodiment described in brief.

During each time the rear vehicle wheel determining routine of the embodiment is executed, first, in step S101 it is determined whether it is possible to accurately calculate the resonance frequency $f_r$ of the rear vehicle wheels, i.e. it is determined whether the rear vehicle wheel is a vehicle wheel for which a resonance frequency is easy to obtain. Step S101 is executed in a manner identical to S52 in FIG. 7.

If it is determined in S101 that the rear vehicle wheel is a vehicle wheel for which a resonance frequency is easy to obtain, then the determination in step S101 becomes YES, the tire pressure of the rear vehicle wheel is determined as abnormal in step S102, and in step S103 the warning device 40 for alerting the driver is turned ON. An execution of the initializing routine is herein completed.

On the contrary, if it is determined in step S101 that the rear vehicle wheel is not a vehicle wheel for which a resonance frequency is easy to obtain, then the determination in step S101 becomes NO, the tire pressure of the rear vehicle wheel is determined as normal in step S104, and in step S105 the warning device 40 for alerting the driver is turned OFF. An execution of the initializing routine is herein completed.

As is apparent from the above description, in the embodiment, the determining unit 20 can be considered as an "estimating unit" of the invention.

Next, a fifth embodiment of the invention will be described. However, the hardware structure of the fourth embodiment is in common with this embodiment, and excluding the rear vehicle wheel determining routine, the software structure is in common. Therefore, a detailed description regarding common factors will be omitted through the usage and citation of identical names and reference numerals, and only factors not in common will be described in detail.

In the rear vehicle wheel determining routine of the first embodiment, the tire pressure is determined as abnormal irrespective of whether the vehicle speed at that time is in a low speed region when the rear vehicle wheel is a vehicle wheel for which a resonance frequency is easy to obtain, i.e. it is easy to accurately calculate the resonance frequency based upon the corresponding vehicle wheel speed.

However, it is possible that the rear vehicle wheel is a vehicle wheel for which a resonance frequency is easy to obtain even if the tire pressure is equivalent to the set pressure when the vehicle speed is in a low speed region. Therefore, there is a possibility that a tire pressure which is actually normal may be falsely determined as abnormal, in a case where the tire pressure is determined as abnormal with only the condition that the rear vehicle wheel be a vehicle wheel for which a resonance frequency is easy to obtain irrespective of wither the vehicle speed is in a low speed region.

Hence, in the embodiment, the tire pressure of the rear vehicle wheel is determined as abnormal when the rear vehicle wheel is a vehicle wheel for which a resonance frequency is easy to obtain and the vehicle is running in a high speed region.

Figure 11:
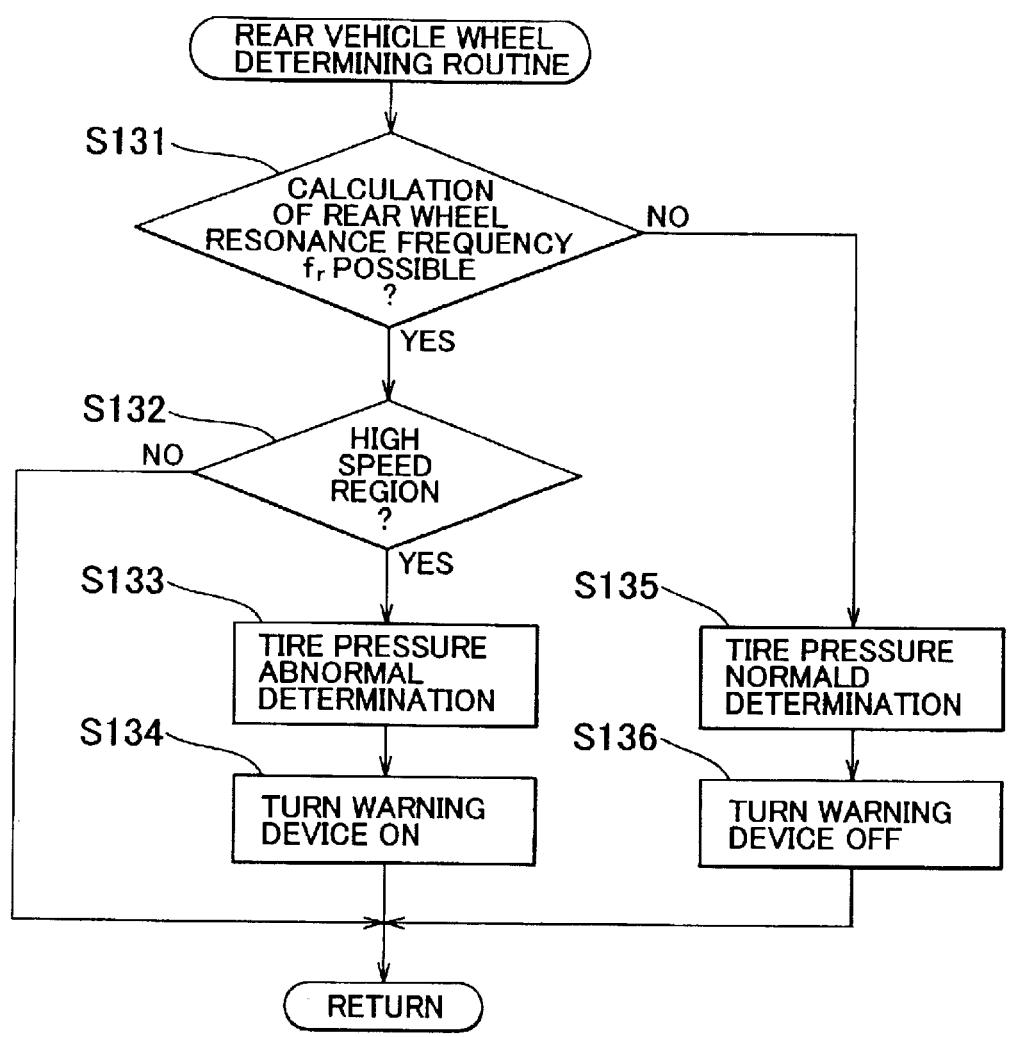
FIG. 11 is a flow chart conceptually representing the content of a rear vehicle wheel determining routine in a tire abnormality determining program of a tire abnormality determining device according to a fifth embodiment of the invention.

FIG. 11 conceptually illustrates the content of the rear vehicle wheel determining routine of the embodiment in a flow chart. Hereinafter, this rear vehicle wheel determining routine will be described with steps in common with the rear vehicle wheel determining routine of the fourth embodiment described in brief.

During each time the rear vehicle wheel determining routine of the embodiment is executed, first, in step S131 it is determined whether it is possible to accurately calculate the resonance frequency $f_r$ of the rear vehicle wheel, i.e. it is determined whether the rear vehicle wheel is a vehicle wheel for which a resonance frequency is easy to obtain. Step S131 is executed in a manner identical to S101 in FIG. 10.

If it is determined in S131 that the rear vehicle wheel is a vehicle wheel for which a resonance frequency is easy to obtain, then the determination in S131 becomes YES, and in S132 it is determined whether the vehicle speed is in a high speed region, i.e. whether the estimated vehicle speed calculated by the execution of the aforementioned vehicle speed estimating program is equal to or above a reference value (for example, 75 km/h or 90 km/h). If the estimated vehicle speed is determined as being equal to or above the reference value, then the determination in step S132 becomes YES, the tire pressure of the rear vehicle wheel is determined as abnormal in step S133, and the warning device 40 for alerting the driver is turned ON in step S134. An execution of the initializing routine is herein completed.

On the contrary, if the estimated vehicle speed is determined as being less than the reference value in step S132, the determination in step S132 becomes NO, and an execution of the rear vehicle wheel determining routine is immediately completed.

In addition, assuming the rear vehicle wheel is a vehicle wheel for which a resonance frequency is easy to obtain, the determination in step S131 becomes NO, the tire pressure is determined as normal in step S135, and the warning device 40 for alerting the driver is turned OFF in step S136. An execution of the initializing routine is herein completed.

As is apparent from the above description, in the embodiment, the determining unit 20 can be considered as an "estimating unit" of the invention.

Having described various embodiments of the invention with reference to the attached drawings, it is to be noted that these are shown as some of the examples of the invention and that it is possible to execute the invention based upon the various variations and improvements according to the knowledge of the person skilled in the art.

For example, in accordance with disturbance observer, a modern control theory, it is possible to estimate tire pressure variation as a disturbance to the corresponding tire. Therefore, the disturbance may be calculated as the reflected value of the tire pressure in place of the resonance frequency of the above-mentioned embodiments, and the tire pressure may be estimated based upon the calculated disturbance.

The determining (or estimating) unit 20 of the illustrated exemplary embodiments is implemented as one or more programmed general purpose computers. It will be appreciated by those skilled in the art that the determining (or estimating) unit can be implemented using a single special purpose integrated circuit (e.g., ASIC) having a main or central processor section for overall, system-level control, and separate sections dedicated to performing various different specific computations, functions and other processes under control of the central processor section. The determining (or estimating) unit can be a plurality of separate dedicated or programmable integrated or other electronic circuits or devices (e.g., hardwired electronic or logic circuits such as discrete element circuits, or programmable logic devices such as PLDs, PLAs, PALs or the like). The determining (or estimating) unit can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein is provided and can be used as the determining (or estimating) unit. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An apparatus for estimating a tire condition amount of that vehicle wheel provided in a vehicle equipped with a plurality of vehicle wheels, each formed with air enclosed under pressure in an inside portion of a tire mounted to a disc wheel, comprising:

a plurality of wheel speed sensors that detect a vehicle wheel speed of each vehicle wheel, each sensor being provided in relation to each of the plurality of vehicle wheels;

an estimating unit that obtains a reflected value reflecting a tire condition amount of each of the plurality of vehicle wheels based upon the vehicle wheel speed detected by each of the plurality of wheel speed sensors, and estimates the tire condition amount of each of the plurality of vehicle wheels based upon the obtained reflected value, wherein the estimating unit estimates a reflected value of a first vehicle wheel for which it is relatively difficult to accurately obtain the reflected value based upon the vehicle wheel speed of the first vehicle wheel among the plurality of vehicle wheels, during a first period corresponding to a second period for obtaining the reflected value of the first vehicle wheel, based upon a reflected value obtained for a second vehicle wheel, for which it is relatively easy to accurately obtain the reflected value of the second vehicle wheel based upon a vehicle wheel speed of the second vehicle wheel, in order to obtain the reflected value of the first vehicle wheel.

2. The apparatus according to claim 1, wherein it is relatively difficult to accurately obtain the reflected value based upon the vehicle wheel speed of the first vehicle wheel, relative to the other vehicle wheels.

3. The apparatus according to claim 1, wherein the first period is a period when it is relatively difficult to accurately obtain the reflected value based upon the vehicle wheel speed of the first vehicle wheel.

4. The apparatus according to claim 3, wherein the estimating unit, in order to initialize an estimating condition used by the estimating unit to estimate the tire condition, obtains the reflected value based upon the detected vehicle wheel speed, executes an initialization that determines an initial value of the reflected value for each of the plurality of vehicle wheels based on the obtained reflected value, and with regard to the first vehicle wheel, determines the estimated reflected value as an initial value of the reflected value of the first vehicle wheel, at the time of establishment of the relationship in which the tire pressures of all the vehicle wheels are presumed to be equivalent to respective set pressures.

5. The apparatus according to claim 4, wherein the estimating unit obtains the reflected value based upon the detected vehicle wheel speed, and determines the obtained reflected value as the initial value, at a time of execution of initialization.

6. The apparatus according to claim 4, wherein the estimating unit obtains the reflected value based upon the detected vehicle wheel speed, and estimates the tire condition amount based upon a variation amount from the initial value of the obtained reflected value after execution of initialization is completed.

7. The apparatus according to claim 1, wherein the estimating unit estimates the reflected value of the first vehicle wheel based upon the reflected value obtained for the second vehicle wheel during the first period and a predetermined reflected value difference that is present among the plurality of vehicle wheels.

8. The apparatus according to claim 7, wherein the estimating unit estimates, at a time of establishment of a predetermined tire condition amount relationship among the plurality of vehicle wheels, the reflected value of the first vehicle wheel based upon the reflected value obtained for the second vehicle wheel, and the predetermined reflected value difference present among the plurality of vehicle wheels, when the tire condition amount relationship is established.

9. The apparatus according to claim 1, wherein the plurality of vehicle wheels includes at least one high-load vehicle wheel on which a relatively large load acts, and at least one low-load vehicle wheel on which a relatively small load acts, wherein the second vehicle wheel is the at least one high-load vehicle wheel, and the first vehicle wheel is the at least one low-load vehicle wheel.

10. The apparatus according to claim 1, wherein the estimating unit determines that there is a high probability that it is difficult to accurately obtain the reflected value if a time-dependent variation of the obtained reflected value is equal to or above a setting state.

11. The apparatus according to claim 1, wherein the reflected value includes a tire vibration resonance frequency.

12. The apparatus according to claim 1, wherein the tire condition amount includes at least one of a tire pressure and a tire deformation amount.

13. The apparatus according to claim 1, wherein the estimating unit obtains the tire vibration resonance frequency as the reflected value based upon the vehicle wheel speed, and estimates the tire pressure as the tire condition amount based upon the obtained resonance frequency.

14. The apparatus according to claim 1, wherein the estimating unit obtains a disturbance to the tire as the reflected value based upon the vehicle wheel speed, through a disturbance observer that estimates variation of the tire pressure as the disturbance, and estimates the tire pressure as the tire condition amount based upon the obtained disturbance.

15. An apparatus for estimating a tire condition amount of a vehicle wheel provided on a vehicle equipped with a vehicle wheel formed with air enclosed under pressure in an inside portion of a tire mounted to a disc wheel, comprising:

at least one wheel speed sensor that detects a vehicle wheel speed of the vehicle wheel;

an estimating unit that, based on the vehicle wheel speed detected by the wheel speed sensor, obtains a reflected value reflecting a tire condition amount of the vehicle wheel and that estimates the tire condition amount based upon the obtained reflected value, wherein the estimating unit determines that there is a high probability that the tire condition amount of the vehicle wheel is normal if it is relatively difficult to accurately obtain the reflected value based upon the detected vehicle wheel speed, and determines that there is a high probability that the tire condition amount of the vehicle wheel is abnormal if it is relatively easy to accurately obtain the reflected value based upon the detected vehicle wheel speed.

16. The apparatus according to claim 15, wherein the estimating unit further determines that there is a high probability that the tire condition amount of the vehicle wheel is abnormal under the condition that the vehicle speed, which is a running speed of the vehicle, is equal to or greater than a reference value when it is easy to accurately obtain the reflected value based upon the detected vehicle wheel speed.

17. The apparatus according to claim 15, wherein when it is easy to accurately obtain the reflected value based upon the detected vehicle wheel speed, the estimating unit obtains a reflected value based upon the vehicle wheel speed, and determines whether the tire condition amount of the vehicle wheel is abnormal based upon that obtained reflected value.

18. The apparatus according to claim 15, wherein the vehicle includes a plurality of vehicle wheels,
the apparatus comprises a plurality of wheel speed sensor that detects a vehicle wheel speed of each vehicle wheel, and
the estimating unit determines whether at least one vehicle wheel is abnormal.

19. The apparatus according to claim 18, wherein the vehicle includes at least one high-load vehicle wheel on which a relatively large load acts, and at least one low-load vehicle wheel on which a relatively small load acts, and wherein the estimating unit determines whether the at least one low-load vehicle wheel is abnormal.

20. The apparatus according to claim 15, wherein the estimating unit determines that there is a high probability that it is difficult to accurately obtain the reflected value if a time-dependent variation of the obtained reflected value is equal to or above a setting state.

21. The apparatus according to claim 15, wherein the reflected value includes a tire vibration resonance frequency.

22. The apparatus according to claim 15, wherein the tire condition amount includes at least one of a tire pressure and a tire deformation amount.

23. The apparatus according to claim 15, wherein the estimating unit obtains the tire vibration resonance frequency as the reflected value based upon the vehicle wheel speed, and estimates the tire pressure as the tire condition amount based upon the obtained resonance frequency.

24. The apparatus according to claim 15, wherein the estimating unit obtains a disturbance to the tire as the reflected value based upon the vehicle wheel speed, through a disturbance observer that estimates variation of the tire pressure as the disturbance, and estimates the tire pressure as the tire condition amount based upon the obtained disturbance.

25. An apparatus for estimating a tire condition amount of that vehicle wheel provided in a vehicle equipped with first and second vehicle wheels, each formed with air enclosed under pressure in an inside portion of a tire mounted to a disc wheel, comprising:
a first wheel speed sensor that detects a first vehicle wheel speed of the first vehicle wheel and that is provided in relation to the first vehicle wheel;
a second wheel speed sensor that detects a second vehicle wheel speed of the second vehicle wheel and that is provided in relation to each of the second vehicle wheel;
an estimating unit that obtains a reflected value reflecting a tire condition amount of the second vehicle wheel for which it is relatively easy to accurately obtain the reflected value of the second vehicle wheel based upon the detected second vehicle wheel speed, relative to the first vehicle wheel, during a first period corresponding to a second period in which it is relatively difficult to obtain a reflected value reflecting a tire condition amount of the first vehicle wheel based upon the first vehicle wheel speed, and estimates the reflected value of the first vehicle wheel based on the obtained reflected value of the second vehicle wheel, and estimates the tire condition amount of the first vehicle wheel based upon the estimated reflected value of the first vehicle wheel.

26. A method for estimating a tire condition amount of a vehicle wheel formed with air enclosed under pressure in an inside portion of a tire mounted on a disc wheel, comprising:
detecting a vehicle wheel speed of each of a plurality of vehicle wheels;
obtaining a reflected value reflecting a tire condition amount of each of the plurality of vehicle wheels based on the detected vehicle wheel speed of each of the plurality of vehicle wheels;
estimating a reflected value of a first vehicle wheel for which it is relatively difficult to accurately obtain the reflected value based upon a vehicle wheel speed of the first vehicle wheel among the plurality of vehicle wheels, during a period corresponding to a period for obtaining the reflected value of the first vehicle wheel, based upon a reflected value obtained for a second vehicle wheel for which it is relatively easy to accurately obtain the reflected value of the second vehicle wheel based upon a vehicle wheel speed of the second vehicle wheel in order to obtain the reflected value of the first vehicle wheel; and
estimating the tire condition amount of each of the plurality of vehicle wheels based upon the obtained reflected value.

27. A method for estimating a tire condition amount of a vehicle wheel formed with air enclosed under pressure in an inside portion of a tire mounted to a disc wheel, comprising:
detecting a vehicle wheel speed of the vehicle wheel;
obtaining a reflected value reflecting a tire condition amount of the vehicle wheel based upon the detected vehicle wheel speed;
estimating the tire condition amount based upon the obtained reflected value; and
determining that there is a high probability that the tire condition amount of the vehicle wheel is normal if it is relatively difficult to accurately obtain the reflected value based upon the detected vehicle wheel speed, and determining that there is a high probability that the tire condition amount of the vehicle wheel is abnormal if it is relatively easy to accurately obtain the reflected value based upon the detected vehicle wheel speed.

28. A method for estimating a tire condition amount of a vehicle wheel formed with air enclosed under pressure in an inside portion of a tire mounted on a disc wheel, comprising:
detecting a first vehicle wheel speed of the first vehicle wheel;
detecting a second vehicle wheel speed of the second vehicle wheel;
obtaining a reflected value reflecting a tire condition amount of the second vehicle wheel for which it is relatively easy to accurately obtain the reflected value of the second vehicle wheel based upon the detected second vehicle wheel speed, relative to the first vehicle wheel, during a first period corresponding to a second period in which it is relatively difficult to obtain a reflected value reflecting a tire condition amount of the first vehicle wheel based upon the first vehicle wheel speed;

estimating the reflected value of the first vehicle wheel based on the obtained reflected value of the second vehicle wheel; and estimating the tire condition amount of the first vehicle wheel based upon the estimated reflected value of the first vehicle wheel.

* * * * *